United States Patent Office 3,520,933
Patented July 21, 1970

3,520,933
PRODUCTION OF AMINES
Karl Adam and Erich Haarer, Ludwigshafen (Rhine), Germany, assignors to Badische Anilin- & Soda-Fabrik Aktiengesellschaft, Ludwigshafen, Rhineland, Germany
No Drawing. Filed Oct. 23, 1967, Ser. No. 677,066
Claims priority, application Germany, Oct. 28, 1966, 1,543,377
Int. Cl. C07c *85/06*
U.S. Cl. 260—585
18 Claims

ABSTRACT OF THE DISCLOSURE

Production of amines by reaction of alcohols, aldehydes or ketones with ammonia or primary or secondary amines at a hydrogen partial pressure of 10 to 350 atmospheres, a total pressure of 20 to 400 atmospheres and temperatures of from 80° to 230° C. in the liquid phase in the presence of supported hydrogenation catalysts which contain 5 to 80% by weight of cobalt and/or nickel and/or copper and/or silver (with reference to the whole of the catalyst mixture), 0.1 to 10% by weight of chromium and/or maganese (with reference to the metal content of the whole catalyst mixture) and 0.1 to 15% by weight of a pyroacid or polyacid (with reference to the reduced catalyst). Terminal aliphatic diamines or M-xylylene diamine are used for the production of polyamides.

---

This invention relates to an improved process for the production of amines from alcohols.

It is known from Houben Weyl, "Methoden der organischen Chemie," volume 11/1 (1957) that amines are obtained from primary alcohols and secondary alcohols by reaction with ammonia in the presence of precious metal, nickel, cobalt or chromite catalysts. When using nickel, cobalt or chromite catalysts, relatively high temperatures are necessary and this results in the formation of large amounts of byproducts. Moreover the reaction in general proceeds slowly in the presence of the said catalysts so that compounds are readily formed by aldol condensation. The activity of the catalysts may be improved by adding alkaline reagents, such as barium oxide, calcium oxide or zinc oxide. These additives have the result however that the catalyst composition agglomerates so that its activity rapidly declines in continuous operation. Moreover the said catalysts have the disadvantage in operation that (as may be seen from loc. cit., table 18, pages 130 et seq.) the substitution reaction in many cases proceeds further on the amines first formed so that more highly substituted amines are formed and this considerably impairs the yield.

It is an object of this invention to provide an improved process for the production of amines in which the catalysts retain their activity over long periods. It is another object of the invention to provide an improved process for the production of amines in which only small amounts of more highly substituted amines are formed.

In accordance with this invention these and other objects and advantages are achieved in an improved process for the production of amines by reaction of alcohols, having up to twenty carbon atoms with at least equivalent amounts of ammonia, primary or secondary alkylamines, cycloalkylamines or aralkylamines having up to twelve carbon atoms in the presence of hydrogen, maintaining a hydrogen partial pressure of 10 to 350 atmospheres, and in the presence of hydrogenation catalysts at pressures of from 20 to 400 atmospheres and temperatures of 80° to 230° C. in the liquid phase, wherein the improvement consists in using a supported hydrogenation catalyst which contains:

(a) 5 to 80% by weight of cobalt and/or nickel and/or copper and/or silver (with reference to the whole catalyst composition);

(b) 0.1 to 10% by weight of chromium and/or manganese (with reference to the metal content of the whole catalyst composition); and (c) 0.1 to 15% by weight of a pyroacid or polyacid (with reference to the reduced catalyst).

Preferred starting materials are aliphatic, cycloaliphatic, araliphatic or aromatic compounds having up to twenty carbon atoms which contain hydroxyl groups. Particularly preferred starting materials have up to twelve carbon atoms and one or two hydroxy groups. They may be unsaturated, containing for example one or two olefinic double bonds. They may also contain substituents which are inert under the reaction conditions, such as alkyl groups having one to four carbon atoms which are attached via ether bridges, or amino groups. Apart from the said substituents, the alcohol or carbonyl compounds have hydrocarbon structure. Particular industrial importance attaches to aliphatic or cycloaliphatic starting materials having up to twelve carbon atoms which contain one or two hydroxyl groups. Examples of suitable compounds are ethanol, propanol, isopropanol, butanol, isobutanol, 2-ethylhexanol, decanol, stearyl alcohol, cyclopentanol, cyclohexanol, cyclooctanol, cyclododecanol, benzyl alcohol, phenylethyl alcohol, phenylhydroquinone, 2-ethylhexanol, butanediol-(1,4), hexanediol-(1,6), pentanediol-(1,5) octanediol-(1,8) monoethanolamine, diethanolamine, propanolamine, cyclohexanediol and amyl alcohol.

The reaction may be carried out not only with ammonia but also with primary amines or secondary amines. Alkylamines, cycloalkylamines or aralkylamines having one to twelve carbon atoms, particularly alkylamines having one to four carbon atoms and one amino group in the molecule are preferred. The preferred amines may have alkoxy groups having one to four carbon atoms as substituents. Examples of suitable amines are methylamine, ethylamine, butylamine, octylamine, decylamine, dimethylamine, diethylamine, methylbutylamine or β-methoxyethylamine. The use of ammonia has acquired particular importance.

The alcohols are advantageously reacted with at least an equivalent amount of ammonia or a primary or secondary amine. The ammonia or the said amine is advantageously used in excess, for example up to 20 moles, preferably 2 to 5 moles, per hydroxyl or carbonyl group. The reaction is carried out in the presence of hydrogen. It is advantageous to use a hydrogen partial pressure of 10 to 350 atmospheres, preferably 200 to 300 atmospheres. The reaction proceeds in general at a total pressure of 20 to 400 atmospheres. It is advantageous to use pressures of 200 to 350 atmospheres.

The reaction is advantageously carried out at temperatures of 80° to 230° C. Particularly good results are obtained when temperatures of 90° to 170° are used.

Supported hydrogenation catalysts are used which contain 5 to 80% by weight, preferably 10 to 40% by weight, of cobalt and/or nickel and/or copper and/or silver and 0.1 to 10% by weight, preferably 0.3 to 3% by weight, of manganese and/or chromium, with reference to the whole of the catalyst composition. Catalysts have proved to be particularly suitable which contain the said amounts of cobalt and/or nickel, particularly cobalt. Examples of suitable carriers for the catalysts are fuller's earth, silicic acid strands, silica gel, aluminum hydroxide or silicates. The catalysts also contain a pyroacid or polyacid in the form of the free acid or at least one salt of the said metals. Suitable acids are those which are converted by heating into their pyro or poly form, such as sulfuric acid, phosphoric acid, boric acid, molybdic acid, titanic acid, vanadic acid or tungstic acid. Particularly good results are obtained when phosphoric acid is used. The acids or their salts are advantageously present in amounts of 0.1 to 15% by weight with reference to the reduced catalyst. Particularly good results are obtained with contents of 0.3 to 5% by weight. All the percentages refer to the contents of the individual components determined analytically in the finished catalyst, the metals being given as such and the pyroacids or polyacids or their salts as anhydrides, i.e. independently of the actual state of combination. The catalysts are advantageously prepared by coprecipitation of the metal components with the acids on a powdered carrier or by coprecipitation with the carrier from aqueous solution, for example with sodium carbonate or sodium hydroxide. The precipitate is washed until neutral and dried, advantageously at temperatures of 60° to 180° C. The catalyst composition is then processed into moldings, pellets or strands and heated for example at 300° to 800° C. in a muffle furnace and then reduced with hydrogen, preferably at 220° to 300° C.

The reaction may be carried out without solvents. It is advantageous however to use as a solvent the reaction product containing the amines and ammonia. It is preferable to add 0.5 to 10 times, particularly 1 to 5 times the amount of reaction product, with reference to fresh reaction mixture. Moreover it has proved to be advantageous to add 10 to 30%, preferably 5 to 15%, by weight of water with reference to the alcohol used. The effect of the water may be intensified by an addition of acid salts, such as primary ammonium phosphate or ammonium bisulfate. Additions of acid salts of 0.01 to 0.5%, preferably 0.01 to 0.1%, by weight with reference to the alcohol used, have also proved to be suitable.

The residence time is of importance for an optimum course of the reaction. The reaction is advantageously carried out so that the residence time does not exceed ten minutes. It is easy to ascertain by preliminary experiment what is the optimum residence time in conjunction with the other reaction conditions, particularly temperature. Another feature of the invention which is used with advantage is the supply, per part by volume of catalyst used, of 0.5 to 1.5 times the amount of fresh starting mixture.

The process according to the invention may be carried out batch-wise, but in commercial operation it is advantageous to carry it out continuously. This latter method will be described by way of example. A vertical high pressure tube which is charged with the said catalyst is supplied at the top with a mixture of alcohol, ammonia, water, reaction product containing ammonia and acid salts in the above mentioned proportions. At the same time hydrogen is metered in cocurrent or countercurrent. The hydrogen is advantageously recycled and enriched with ammonia. During the reaction the said said conditions of pressure and temperature are maintained. The reaction product is freed from ammonia and purified by fractional distillation.

The amines obtained by the process according to this invention are suitable for the production of high polymers, pharmaceuticals and pest control agents. For example terminal aliphatic diamines or m-xylylenediamine may be used for the production of polyamides.

The invention is illustrated by the following examples. The parts specified in the following examples are parts by weight, unless otherwise stated. They bear the same relation to parts by volume as the kilogram to the liter.

EXAMPLE 1

A vertical high pressure tube having a capacity of 275 parts by volume is charged with 250 parts by volume of a catalyst which contains 14.4% by weight of cobalt, 1.0% by weight of chromium and 0.36% by weight of phosphorus pentoxide on aluminum oxide. 65 parts of ethylhexanol, 65 parts of liquid ammonia, 130 parts of reaction product and 250,000 parts by volume of recycle gas which has a temperature of 130° C. and is saturated with ammonia are supplied per hour to the top of the reaction tube. The reaction is carried out at 140° C. and a hydrogen pressure of 300 atmospheres. The reaction product which has been freed from ammonia contains 12% by weight of water. 57 parts (88.5% of the theory) of ethylhexylamine, 1.95 parts (3% of the theory) of unreacted ethylhexanol and 6.5 parts (8.5% of the theory) of polyamine are obtained per hour by distillation. Unreacted ethylhexanol and polyamine are returned to the reaction.

EXAMPLE 2

A vertical high pressure tube having a capacity of 275 parts by volume is charged with 250 parts by volume of a catalyst which contains 17.5% by weight of cobalt, 0.9% by weight of chromium and 0.36% by weight of phosphorus pentoxide on aluminum oxide. 60 parts of isopropanol, 12 parts of water, 60 parts of liquid ammonia, 120 parts of reaction product and 150,000 parts by volume of a mixture of fresh hydrogen and recycle hydrogen which is saturated with ammonia and which has a temperature of 140° C. are metered into the top of the reaction tube. The reaction is carried out at 150° C. and 300 atmospheres. The reaction product is freed from ammonia and purified by distillation. 54.4 parts per hour (90.5% of the theory) of isopropylamine, 1.92 parts (3.2% of the theory) of isopropanol and 3.72 parts (6.3% of the theory) of polyamine are obtained. Unreacted isopropanol and the polyamines are returned to the reaction.

EXAMPLE 3

The apparatus described in Example 1 is charged with 250 parts by volume of a catalyst which contains 17.5% by weight of cobalt, 0.9% by weight of manganese and 0.36% by weight of phosphorus pentoxide on aluminum oxide. 75 parts of propanolamine-(1,2), 75 parts of liquid ammonia, 175 parts of reaction product and 125,000 parts of recycle hydrogen which is saturated with ammonia and has been enriched with fresh hydrogen and which has a temperature of 160° C. are metered per hour into the top of the reaction tube. The reaction is carried out at 160° C. and 300 atmospheres hydrogen pressure. The product, freed from ammonia, is purified by distillation. 67.5 parts (91.4% of the theory) of propylenediamine-1,2, 1.18 parts (1.6% of the theory) of dimethylpiperazine, 2.02 parts (2.7% of the theory) of propanolamine-(1,2) and 3.18 parts (4.3% of the theory) of non-distillable residue are obtained per hour. The unreacted propanolamine-(1,2) and the dimethylpiperazine are returned to the reaction.

EXAMPLE 4

An apparatus and the catalyst as described in Example 2 are used. 60 parts of monoethanolamine, 120 parts of liquid ammonia and 125,000 parts by volume of recycle hydrogen which is saturated with ammonia and which has a temperature of 160° C. are metered in per hour at the top of the tube. The hydrogen used up is replaced by fresh hydrogen. The reaction is carried out at 160° C. and at a hydrogen pressure of 300 atmospheres. The reaction mixture is freed from ammonia and fractionally distilled. 22.8 parts (38% of the theory) of ethylenediamine, 28.6 parts (46.9% of the theory) of monoethanolamine 5.7 parts (9.5% of the theory) of piperazine and 3.69 parts (5.6% of the theory) of residue are obtained per hour. The monoethanolamine and piperazine are returned to the reaction.

EXAMPLE 5

A high pressure tube which is charged with 750 parts by volume of a catalyst as described in Example 2 is fed at the top per hour with 118 parts of hexanediol-(1,6), 12 parts of an aqueous 0.02% by weight solution of tert. ammonium phosphate, 40 parts of hexamethylenimine, 450 parts of liquid ammonia and 150 parts by volume of hydrogen ((consisting of fresh hydrogen and hydrogen saturated with ammonia which has been recycled). The reaction is carried out at 165° C. and a hydrogen pressure of 300 atmospheres. The reaction product is freed from ammonia, hexamethylenimine and water are separated and after it has been adjusted to the water content of the reaction feed and addition of ammonium phosphate, it is returned to the reaction. Distillation of the residue gives per hour 87.5 parts (86.5% of the theory) of hexamethylendiamine, 12.4 parts (12.5% of the theory) of polyamines which have a content of less than 1% by weight of hexanediol-(1,6), and aminohexanol-(1,6).

EXAMPLE 6

118 parts of hexanediol-(1,6), 12.4 parts of the polyamide obtained in Example 5, 240 parts of liquid ammonia and 80,000 parts by volume of hydrogen which is saturated with ammonia and has a temperature of 230° C. are metered in to the top of a vertical high pressure tube which is charged with 750 parts by volume of a catalyst which contains 17.4% by weight of cobalt, 0.9% by weight of chromium and 0.3% by weight of phosphorus pentoxide on aluminum oxide. The reaction is carried out at 230° C. and a hydrogen pressure of 300 atmospheres. The reaction product is freed from ammonia and purified by fractional distillation. 89 parts (88.7% of the theory) of hexamethylenimine and 12.6 parts (11.3% of the theory) of polyamines are obtained. The polyamines are returned to the reaction.

We claim:
1. A process for the production of amines which comprises reacting aliphatic or cycloaliphatic alcohols having up to twelve carbon atoms and containing one or two hydroxyl groups with at least an equivalent amount of ammonia or a primary or secondary alkylamine, cycloalkylamine or aralkylamine respectively having up to twelve carbon atoms in the presence of a hydrogenation catalyst and hydrogen, a hydrogen partial pressure of 10 to 350 atmospheres being maintained at pressures of 20 to 400 atmospheres and at temperatures of 80° to 230° C. in the presence of a supported hydrogenation catalyst which contains 5 to 80% by weight of cobalt and/or nickel with reference to the whole of the catalyst composition and 0.1 to 10% by weight of chromium and/or manganese with reference to the metal content of the whole catalyst composition and 0.1 to 15% by weight of an inorganic pyroacid or polyacid with reference to the reduced catalyst.
2. A process as claimed in claim 1 wherein ammonia is used for the reaction.
3. A process as claimed in claim 1 wherein a primary alkylamine or secondary alkylamine having one to four carbon atoms is used.
4. A process as claimed in claim 1 wherein up to 20 moles of ammonia is used for each hydroxyl group.
5. A process as claimed in claim 1 wherein 2 to 5 moles of ammonia, primary amine or secondary amine is used for each hydroxyl group.
6. A process as claimed in claim 1 wherein the hydrogen partial pressure is 200 to 300 atmospheres.
7. A process as claimed in claim 1 wherein the total pressure is from 200 to 350 atmospheres.
8. A process as claimed in claim 1 wherein the temperature is from 90° to 170° C.
9. A process as claimed in claim 1 wherein the hydrogenation catalyst is a supported catalyst which contains 10 to 40% by weight of cobalt and/or nickel with reference to the whole of the catalyst composition.
10. A process as claimed in claim 1 wherein a supported hydrogenation catalyst is used which contains 5 to 80% by weight of cobalt.
11. A process as claimed in claim 1 wherein the hydrogenation catalyst used contains 0.3 to 3% by weight of manganese and/or chromium with reference to the metal content of the catalyst.
12. A process as claimed in claim 1 wherein the hydrogenation catalyst contains 0.3 to 5% by weight of a pyroacid or polyacid with reference to the reduced catalyst.
13. A process as claimed in claim 1 wherein a hydrogenation catalyst is used which has polyphosphoric or pyrophosphoric acid as the pyroacid or polyacid.
14. A process as claimed in claim 1 wherein 0.5 to 10 times the amount of reaction product with reference to the fresh reaction mixture is used as a solvent.
15. A process as claimed in claim 1 wherein the reaction is conducted in the presence of 10 to 30% by weight of water with reference to alcohol.
16. A process as claimed in claim 1 wherein the reaction is conducted in the presence of 0.01 to 0.5% by weight of an acid salt with reference to the alcohol.
17. A process as claimed in claim 1 wherein the reaction mixture has a residence time in contact with the catalyst of not more than ten minutes.
18. A process as claimed in claim 1 wherein 0.5 to 1.5 parts by volume of fresh reaction mixture is used per part by volume of hydrogenation catalyst used and per hour.

References Cited
UNITED STATES PATENTS 3,128,311    4/1964    Shirley et al.
3,383,417    5/1968    Lichtenwalter.

CHARLES B. PARKER, Primary Examiner

R. L. RAYMOND, Assistant Examiner

U.S. Cl. X.R.

252—432, 435, 436, 470, 471; 260—563, 570.8, 570.9, 583, 584